United States Patent Office 2,914,794
Patented Dec. 1, 1959

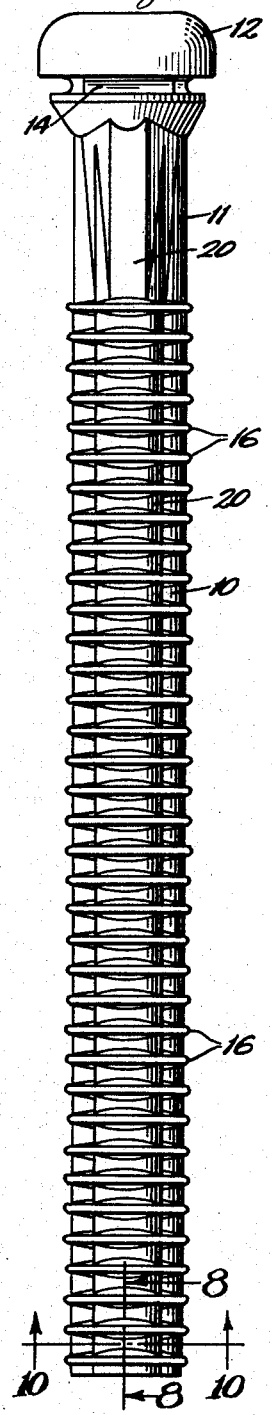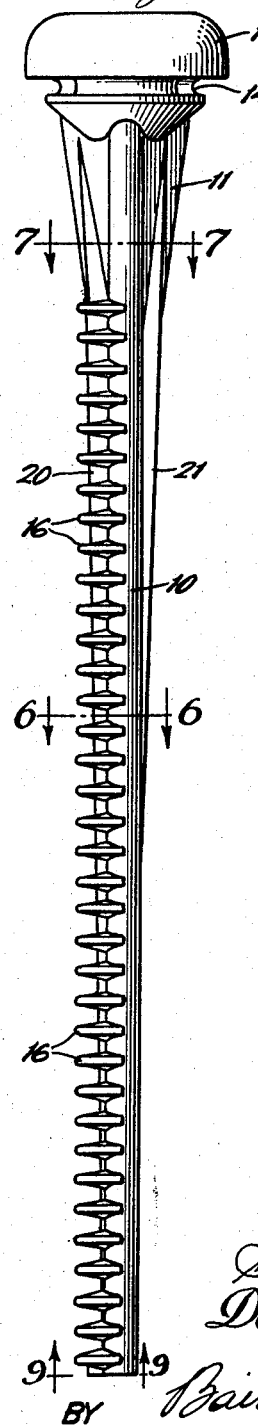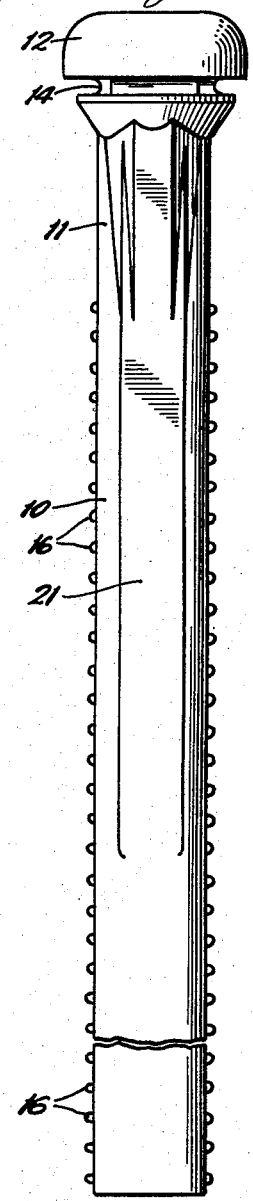

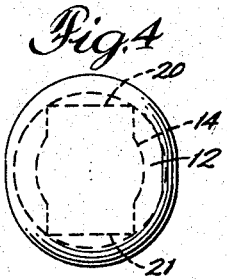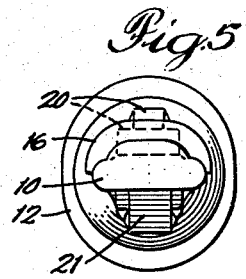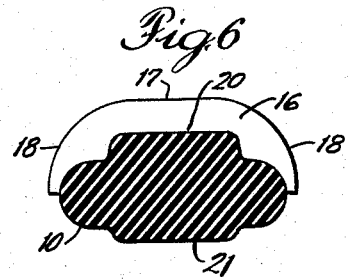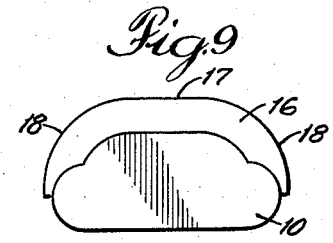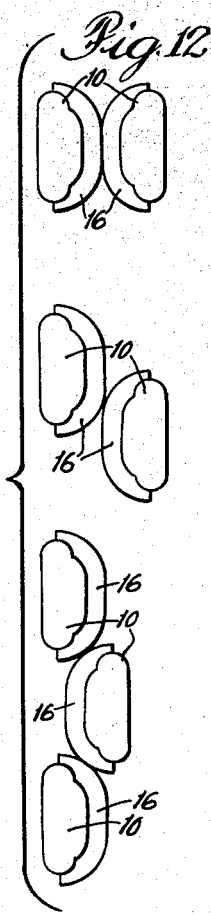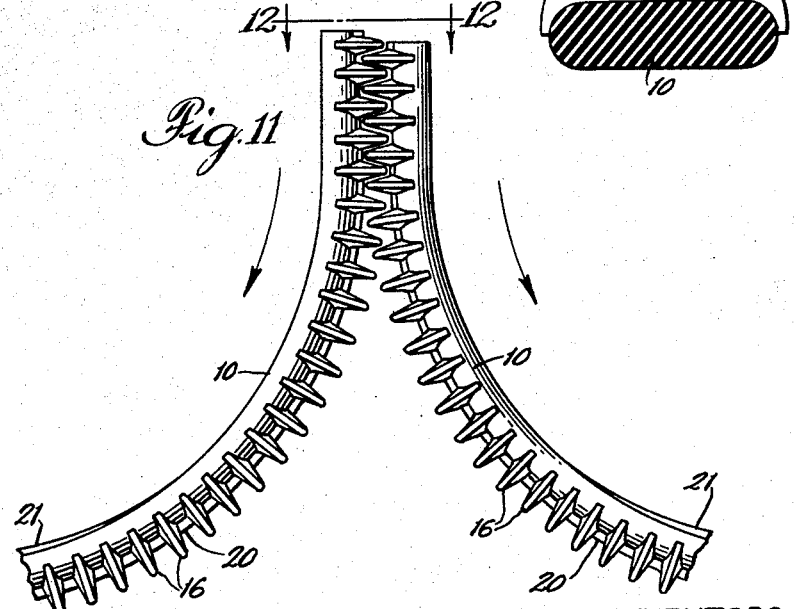

2,914,794

FOWL PICKING FINGERS

Seth S. Barker and Donald P. Smith, Ottumwa, Iowa, assignors to Barker Poultry Equipment Co., Ottumwa, Iowa, a corporation of Iowa Application June 17, 1957, Serial No. 665,938

12 Claims. (Cl. 17—11.1)

This invention relates to improvements in picking fingers for use in apparatus for removing feathers from fowls. Such apparatus has, in recent years, become widely and extensively used in processing of fowls. Feather picking fingers employed in currently available apparatus are usually made of flexible material, such as rubber, having an elongated picking portion formed as a continuation of a shank portion on the end of which is formed a head for mounting in an aperture formed in the curved surface of a rotatable drum, and the picking portion of the fingers is of elongated form and is provided with a series of transversely extending, longitudinally spaced apart, ribs—or a series of spaced apart nipples or projections.

The fowl processing industry has been constantly endeavoring to obtain an efficient and high rate of production in processing of fowls. There currently exists a strong demand for increasing the speed of the production line for removing feathers from the fowls. It is well known that to increase the speed of picking feathers from fowls, by utilizing apparatus having presently available types of picking fingers, the life of the picking fingers is greatly reduced and, more importantly, there results increased bruising, damage or barking of the skin of the fowls. This latter condition results in down-grading of the quality of the fowls, thereby causing a reduction in operating profits of the processer.

One of the objects of the present invention is to provide a novel form of picking finger which eliminates localizing of stress in the finger incident to bending of the finger between successive ribs or rows of nipples during the picking action.

Another object is to provide a novel form of picking finger wherein the picking portion is of generally flattened form in cross-section and is provided with one or more longitudinally extending reinforcing ribs for providing a gradual bending action of the finger between the zone of contact of said picking portion of the finger with the body of a fowl and the mounting end of the finger, by virtue of which the operating life of the finger is greatly increased.

A further object is to provide an improved picking finger having a plurality of picking ribs of novel form and relationship to the body of the finger for providing greatly improved picking action in general, and minimizing barking, damage and bruising of the skin of the fowls. Such fingers, in a shortened form, are especially suitable for efficiently picking wing quills and necks of the fowls without causing barking or injury to the skin of the fowls.

Other objects and advantages of this invention will be apparent from the following description taken in connection with the accompanying drawings, in which:

Figure 1 is a top plan view of the picking finger embodying the present invention.

Figure 2 is a side elevational view of the picking finger.

Figure 3 is a bottom plan view of the picking finger.

Figure 4 is an end elevational view taken at the mounting or head end of the picking finger.

Figure 5 is an end view taken at the free end of the picking finger.

Figures 6 and 7 are transverse sectional views, on an enlarged scale, taken substantially as indicated at lines 6—6 and 7—7 on Figure 2.

Figure 8 is a fragmentary, longitudinal sectional view, on an enlarged scale, taken as indicated at line 8—8 on Figure 1.

Figure 9 is an end view, on an enlarged scale, of the free end portion of the finger, taken as indiacted at line 9—9 on Figure 2.

Figure 10 is an enlarged transverse sectional view, taken as indicated at line 10—10 on Figure 1.

Figure 11 is a fragmentary view, showing the relationship of a pair of fingers carried on a pair of cooperating rotatable drums.

Figure 12 is a fragmentary, diagrammatic view, taken as indicated at line 12—12 on Figure 11, showing the relationship of two series of fingers carried by a pair of cooperating rotatable drums.

The picking finger embodying the present invention is adaptable for use in connection with automatic picking machines comprising a pair of cooperating rotatable drums having a multiplicity of fingers mounted thereon in radial relationship and in longitudinal rows. The fowls to be defeathered are usually suspended from a shackle on an overhead conveyor and are moved between the cooperating drums so that all portions of the body of the fowls is subjected to the action of the picking fingers to effect removal of the feathers from the fowls. The picking finger embodying the present invention is also adapted for use in connection with manual machines wherein a single rotatable drum is employed and provided with a multiplicity of fingers arranged radially and in longitudinal rows, and wherein the fowl is manually positioned into contact with the rotatable picking fingers.

Our novel picking finger is formed as a unitary article, of resilient material, such as rubber or the like, and comprises an elongated picking portion 10, which is formed as a continuation of a shank portion 11, and the free end of said shank portion is formed with an integral mounting head 12. The head is formed with an undercut portion 14, of an irregular contour as indicated in dotted lines in Figure 4, which corresponds to the shape of the opening formed in the outer wall of the picking drum in which the finger is to be mounted in a manner well understood in the art.

The elongated picking portion 10, comprises a body of flattened bar-like form in cross section, providing two main, wide, upper and lower surfaces, as clearly seen in Figure 10 of the drawings, having its opposite edges of rounded contour for purposes which will be hereinafter described. The upper surface of the picking portion is provided with a multiplicity of transversely extending, longitudinally spaced apart picking ribs 16, which are of uniform shape and height with respect to the bar-like form of the body of said picking portion. Said ribs are of novel configuration and have their outer edges shaped to provide a relatively flat or straight central portion, as indicated at 17, the opposite ends of which merge into curved edge portions 18, which extend beyond the rounded side edges of the bar-like body of said picking portion, as clearly seen in Figures 6, 9 and 10 of the drawings.

Formed on the upper surface of the picking portion 10, and shank portion 11, is an elongated reinforcing rib 20, which extends from the free end portion of the picking portion to the mounting head 12. Formed on the underside of the finger is a reinforcing rib 21, which extends throughout the major portion of the length of the picking portion 10, and throughout the length of the shank portion, and terminates at the mounting head 12.

When the fingers are mounted on a rotatable drum, they extend in an outwardly direction. Due to the centrifugal force, incident to rotation of the drum, the fingers tend to assume a rearwardly curved form with respect to the direction of rotation of the drum, and assume a strong rearwardly curved position, such as seen in Figure 11, when the fingers impinge upon an interfering object, such as a fowl, or another finger. As the fingers come into contact with the fowl, they become momentarily arrested, but since the mounting portion of the finger continues onward in a curved path of movement, portions of the fingers are sharply bent with respect to other portions thereof. The fingers are drawn over the body of the fowl, and during which movement the transverse ribs 16 engage the feathers and pull them from the body of the fowl. Due to the flat bar-like form of the body of the picking portion 10, of the finger, it tends to eliminate localization of stress incident to such bending action between successive picking ribs 16, as exists in connection with picking fingers of prior types, such as fingers which are rounded or half rounded in cross section. The provision of longitudinally extending reinforcing ribs 20 and 21, serve to provide a gradual bending action of the picking portion and shank portion from the area of contact of the finger with the fowl to the mounting head of the finger. Thus, due to the bar-like form of the body of the picking portion, and the provision of the reinforcing ribs, it is found that the life of the finger is greatly increased as compared to prior types of picking fingers, and makes it possible to utilize our novel fingers in situations where increased rate of picking production is required, and particularly where more drastic picking action may be required without causing any appreciable injury or barking of the skin of the fowl.

Our novel picking finger may be produced in somewhat shorter length than that represented in the drawings so that the finger is somewhat less flexible. Such a finger is particularly suitable in picking wing quills and the necks of the fowls because these portions of the fowls may be subject to more drastic picking action without causing damage, injury to, or barking of the skin of the fowls.

The generally flattened design of the finger results in increased width of the finger so as to afford increased surface area for grasping or rubbing contact with the feathers of the fowl as compared to the extent of grasping and rubbing contact afforded by currently used round or semi-round fingers. A picking finger having a totally flat picking surface is not deemed satisfactory because it tends to localize pressures at the edges of the picking ribs, or to a solid section of the body of the picking portion which would be applied to the body of the fowls, whenever the fingers twist or turn during the picking operation, causing injury and barking of the skin of the fowls. It is recognized that sharp points or sharp edges on picking fingers tend to wear quickly, and often result in injury and barking of the skin. Further, a smooth heavy surface, such as a side of a finger of rectangular cross-section, likewise causes severe bruising and barking of the skin of the fowl. By extending the picking ribs beyond the side edges of the body of the picking portion, and by rounding the side edges of the body of the picking portion, bruising, damaging and barking of the skin of the fowls is substantially eliminated. By providing picking ribs having a central, relatively flat portion, as herein disclosed, provides increased surface contact with the feathers of the fowl and facilitates the removal of the feathers from the body of the fowl.

When the fingers are used on machines having a pair of cooperating drums, the fingers are preferably offset, in random fashion, longitudinally on one drum with respect to the fingers of the other cooperating drum, so that when the fingers of opposite drums are brought into contact with each other, some fingers will have the flat portion 17 of the picking ribs 16, positioned in registration with each other, and other fingers of one drum are staggered in offset relation to the fingers of the other drum, as represented in Figure 12 of the drawings. By virtue of such an arrangement, the flat portions 17 of the picking ribs 16, on opposite drums, tend, at times, to grasp therebetween the feathers of the fowl, as contrasted with the usual practice where the fingers continuously strike a wiping blow to the body of the fowls for withdrawing the feathers therefrom. The rounded or curved portions 18 of the picking ribs enable the picking ribs to grasp the quills even when the fingers on a pair of coordinating drums are not in exact opposed relation, as may be clearly noted from the representation in Figure 12 of the drawings. Because the curved portions 18 of the picking ribs extend laterally beyond the rounded edges of the body of the picking portion of the finger, damage, breaking or barking of the skin of the fowls is substantially eliminated.

When such fingers are used in connection with manual picking machines, wherein a single rotatable drum is employed, the flattened surface of the picking portion, including the straight edge portions of the picking ribs, provides increased surface area of contact with the feathers of the fowl for expeditious removal of the feathers from the body of the fowl. If the fingers contact a portion of the body of the fowl from which feathers have already been removed, because of the width of the flattened finger, the force applied in the picking action is distributed over a substantial area of the body of the fowl so that the force of impact per unit of area is greatly reduced, and possible injury or barking of the skin of the fowl is reduced to a practical minimum.

To further increase the life and usefulness of a picking finger embodying the present invention, the under surface of the picking finger may be provided with a similar series of picking ribs 16, so that after the finger has been in use for a period of time and there has been substantial wear of the picking ribs, the fingers may be removed from the drum and reversed 180 degrees, so as to present an entirely new working surface, having a new set of picking ribs.

Although we have herein shown and described a certain preferred embodiment of our invention, manifestly it is capable of modification and rearrangement without departing from the spirit and scope thereof. We do not, therefore, wish to be understood as limiting this invention to the precise embodiment herein disclosed, except as we may be so limited by the appended claims.

We claim:

1. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof, providing two main wide surfaces, a plurality of longitudinally spaced apart, transverse ribs of uniform shape and height on one of the main wide surfaces of said picking portion, and means constituting a part of the picking portion for varying the flexibility of said picking portion throughout its length, for reducing localization of stress in use.

2. A fowl picking finger of the character described comprising a unitary body of flexible material having a mounting head, a shank portion connected to the head, an elongated picking portion constituting a continuation of the shank portion, said picking portion being of flattened bar-like form in cross section and having rounded edges throughout the length thereof, providing two main, wide surfaces, a plurality of longitudinally spaced apart, transverse ribs of uniform shape and height on one of the main wide surfaces of said picking portion, each of said transverse ribs having a relatively flat or straight central edge portion, and means constituting a part of the picking portion for varying the flexibility of said picking portion throughout its length, for reducing localization of stress in use.

3. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces, a plurality of longitudinally spaced apart, transverse ribs on one of the main wide surfaces of said picking portion, and a reinforcing rib on said main wide surfaces of said picking portion extending from the free end throughout the length of said portion, for varying the flexibility of the picking portion throughout its length, for reducing localization of stress in use.

4. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces, a plurality of longitudinally spaced apart, transverse ribs on the upper surface of said picking portion, and a reinforcing rib on one of the main wide surfaces of said picking portion, tapering from the free end of said portion throughout the length thereof, whereby the effective surface areas of said transverse ribs gradually varies from the free end to the other end of said picking portion.

5. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces, a plurality of longitudinally spaced apart, transverse ribs on one of the main wide surfaces of said picking portion, and a reinforcing longitudinal rib on said main wide surface and extending throughout the major portion of the length of said picking portion and throughout the length of the shank portion, for varying the flexibility of the picking portion throughout its length, for reducing localization of stress in use.

6. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces, a plurality of longitudinally spaced apart, transverse ribs on one of the main wide surfaces of said picking portion, and a reinforcing longitudinal rib on the other main wide surface and extending in registration with a part of the length of said picking portion and throughout the length of the shank portion, for varying the flexibility of the picking portion throughout its length, for reducing localization of stress in use.

7. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces, a plurality of longitudinally spaced apart, transverse ribs on one of the main wide surfaces of said picking portion, and reinforcing longitudinal ribs on both of the main wide surfaces and extending in registration with a part of the length of said picking portion and throughout the length of the shank portion, for varying the flexibility of the picking portion throughout its length, for reducing localization of stress in use.

8. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces, and a plurality of longitudinally spaced apart, transverse ribs on one of the main wide surfaces of said picking portion, said transverse ribs extending laterally beyond the side edges of said picking portion.

9. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces and a plurality of longitudinally spaced apart, transverse ribs on one of the main wide surfaces of said picking portion, said transverse ribs having a relatively flat or straight edge portion at the center part, merging into curved portions which extend laterally beyond the side edges of said picking portion.

10. A fowl picking finger of the character described comprising a unitary body of flexible material having a mounting head, a shank portion connected to the head, an elongated picking portion constituting a continuation of the shank portion, said picking portion being of flattened bar-like form in cross section and having rounded edges throughout the length thereof, providing two main, wide surfaces, and a plurality of longitudinally spaced apart, transverse ribs of uniform shape and height on one of the main wide surfaces of said picking portion, said transverse ribs having a relatively flat or straight edge portion at the center part, merging into curved portions which extend laterally beyond the side edges of said picking portion.

11. A fowl picking finger of the character described comprising a unitary body of flexible material having a mounting head, a shank portion connected to the head, an elongated picking portion constituting a continuation of the shank portion, said picking portion being of flattened bar-like form in cross section throughout the length thereof and providing two main, wide surfaces, a plurality of longitudinally spaced apart, transverse ribs on one of the main wide surfaces of said picking portion, each of said transverse ribs having a relatively flat or straight central edge portion, and a reinforcing longitudinal rib on said main wide surface and extending throughout the major portion of the length of said picking portion and throughout the length of the shank portion and tapering in thickness throughout the major portion of the length thereof, for varying the flexibility of the picking portion throughout its length, for reducing localization of stress in use.

12. A fowl picking finger of the character described comprising a unitary body of flexible material having a mounting head, a shank portion connected to the head, an elongated picking portion constituting a continuation of the shank portion, said picking portion being of flattened bar-like form in cross section and rounded side edges throughout the length thereof, providing two main, wide surfaces, and a plurality of longitudinally spaced apart, transverse ribs on one of the main wide surfaces of said picking portion, said transverse ribs extending laterally beyond the side edges of said picking portion, and having a relatively flat or straight central edge portion.

References Cited in the file of this patent

UNITED STATES PATENTS

| | | |
|---|---|---|
| 2,559,001 | Barker | July 3, 1951 |
| 2,595,435 | Wolfinger | May 6, 1952 |
| 2,641,796 | Johnson | June 16, 1953 |